US012783440B2

(12) United States Patent
Hsu et al.

(10) Patent No.: US 12,783,440 B2
(45) Date of Patent: Nov. 3, 2026

(54) EXAMINING CPU INTERCONNECT BUSES IN A MULTIPROCESSOR SYSTEM

(71) Applicant: Hewlett Packard Enterprise Development LP, Spring, TX (US)

(72) Inventors: Hong-Jen Hsu, New Taipei City (TW); Chih-Kang Lin, Taipei City (TW); Chia-Wei Chu, Taipei City (TW)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/593,199

(22) Filed: Mar. 1, 2024

(65) Prior Publication Data

US 2025/0278376 A1 Sep. 4, 2025

(51) Int. Cl.
*G06F 13/28* (2006.01)

(52) U.S. Cl.
CPC .................................... *G06F 13/28* (2013.01)

(58) Field of Classification Search
CPC ....................................................... G06F 13/28
USPC ............................................................ 710/22
See application file for complete search history.

(56) References Cited

U.S. PATENT DOCUMENTS 8,407,377 B1 * 3/2013 Shapiro ................... G06F 3/067 711/5
9,146,890 B1 * 9/2015 Brown ................ G06F 13/4022
11,249,876 B2 2/2022 Singhal et al.
11,394,621 B2 7/2022 Tootaghaj et al.
11,757,712 B1 9/2023 Thanabalan
2008/0137676 A1 * 6/2008 Boyd ...................... H04L 49/25 370/419
2008/0183882 A1 * 7/2008 Flynn ...................... G06F 3/065 711/E12.04
2014/0337540 A1 * 11/2014 Johnson .................. G06F 13/14 710/5
2015/0067229 A1 * 3/2015 Connor ............... G06F 13/4022 710/317
2017/0177528 A1 * 6/2017 Harriman ............ G06F 13/4282
2020/0300910 A1 * 9/2020 Kutz .................... H03K 19/173
2021/0105207 A1 * 4/2021 Sen ....................... G06F 13/385
2023/0188441 A1 6/2023 Hughes et al.
2024/0004769 A1 1/2024 Hsu et al.

OTHER PUBLICATIONS

PCI Express Switches, https://www.broadcom.com/products/pcie-switches-bridges/pcie-, accessed Dec. 4, 2023. 3 pages.
N.T.T. Le et al., “Big Data Analytics and Machine Learning for Industry 4.0: an Overview,” Industry 4.0 Interoperability, Analytics, Security, and Case Studies, G. Rajesh et al. editors, Chapter 1 (1-11), CRC Press, 2021. 14 pages.

* cited by examiner

*Primary Examiner* — Titus Wong
(74) *Attorney, Agent, or Firm* — Slater Matsil, LLP

(57) ABSTRACT

A DMA controller of a peripheral switch is programmed to transfer memory contents to a switch memory including an instruction for a second processor. The instruction is sent from a second port of the switch coupled to a second peripheral lane of the second processor. Then, the contents are transferred to the switch memory using a first port of the switch coupled to a first peripheral lane of the first processor. The memory contents include first data transferred by the second processor to the first processor using a central processing unit (CPU) bus connection in response to the instruction.

20 Claims, 8 Drawing Sheets

EXAMINING CPU INTERCONNECT BUSES IN A MULTIPROCESSOR SYSTEM

BACKGROUND

Multiprocessor computer systems with multiple central processing units (CPUs) promise to increase computing power while remaining compatible with existing networks and operating systems. The server or desktop market segments often employ multiprocessor architectures, with each processor supporting multiple internal cores and various external communication buses. Interprocessor communication is performed using CPU interconnect buses that may be used in shared-memory multiprocessor systems to communicate between individual processors that can share a common memory space with each other, though each individual processor may have a non-uniform access to the shared memory with respect to the other individual processors. Furthermore, symmetric multiprocessor systems that utilize shared memory and a tightly-coupled symmetric multiprocessor system that handles each processor in an identical manner have become a de-facto standard among processor manufacturers.

Thus, in a multiprocessor context, the distribution of computing tasks and access to the shared memory is coordinated and facilitated by the CPU interconnect buses that typically represent the highest throughput bandwidth and lowest latency inter-processor communication in such multiprocessor systems. However, an actual workload scalability, and hence, aggregate performance of any multiprocessor system, may increase slower than an actual number of individual processors used.

BRIEF DESCRIPTION OF THE DRAWINGS

Aspects of the present disclosure are best understood from the following detailed description when read with the accompanying figures.

Corresponding numerals and symbols in the different figures generally refer to corresponding parts unless otherwise indicated. The figures are drawn to clearly illustrate the relevant aspects of the disclosure and are not necessarily drawn to scale or perspective.

DETAILED DESCRIPTION

Figure 1:
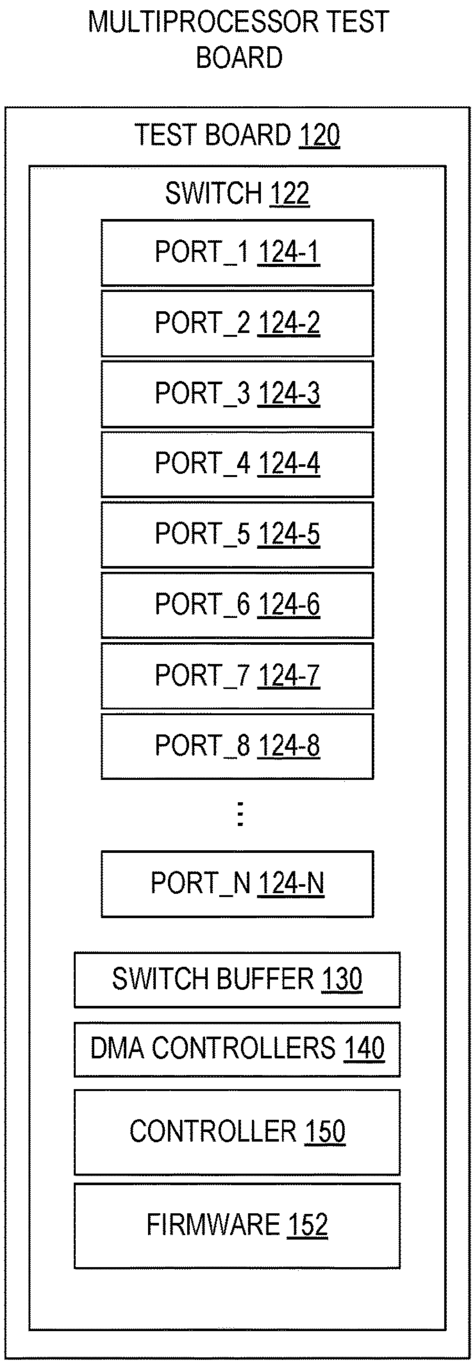
FIG. 1 is a depiction of a test board for examining CPU interconnect buses in a multiprocessor system, in an example.

The following disclosure provides different examples for implementing different features. Specific examples of components and arrangements are depicted for descriptive clarity in the present disclosure. The present disclosure provides examples that are not intended to be limiting implementations of the subject matter disclosed herein.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

CPU performance has increased rapidly alongside the improvements in semiconductor technology. The advancement has occurred with mobile processors but also with server systems, gaming systems, and other computer systems, that often employ multiprocessor architectures, with each processor supporting multiple internal cores and various external communication buses. CPU interconnect buses may be used in shared-memory multiprocessor systems to communicate between individual processors that can share a common memory space with each other, though each individual processor may have a non-uniform access to the shared memory with respect to the other individual processors. Furthermore, in some systems, symmetric multiprocessor systems use shared memory and a tightly-coupled symmetric multi-processor operating system may handle each processor in a similar manner.

In a multiprocessor context, the distribution of computing tasks and access to the shared memory may be coordinated and facilitated by the CPU interconnect buses that may provide high throughput bandwidth and low latency interprocessor communication in such multiprocessor systems. However, an actual workload scalability, and hence, aggregate performance of any multiprocessor system may increase slower than an actual number of individual processors used. The reasons for such reduced workload scalability can be complex and can depend on various internal and external factors, such as architectural capabilities of the hardware, as well as design of the software being executed on the hardware, such as the multiprocessor operating system used.

In operation of such multiprocessor architectures and components, the performance issues may arise or may be indicated within interprocessor communications that occur using the CPU interconnect buses, which link the individual processors together. Examining interprocessor communications can represent a fundamental technique for debugging and improving the overall workload scalability of multiprocessor systems. However, such examining may be highly complex and difficult due to the large volume of data and the high speed of the data transfers, along with the low latency of the CPU interconnect buses that are employed. This complexity and difficulty may increase as processor performance and capability increase, potentially resulting in greater losses of potential performance when coordination between individual processors is not sufficiently optimized to the workload.

The ability to debug and test CPU interconnect buses may be an important capability in the design, development, and evaluation of multiprocessor computer systems. For example, the ability to debug and test the CPU interconnect buses, as a part of examination, potentially while operating at or near full speed and at or near full capacity, which may be referred to as a 'saturation' condition of the interprocessor communications, may be important. As a particular example, when some or all CPU interconnect buses are operating in a saturation condition, certain errors may occur that adversely affect workload processing, but that are particularly difficult to detect and track. Therefore, the ability to saturate multiple CPU interconnect buses simultaneously and then examine the resulting behavior of each individual processor or other components in a multiprocessor system is an important technological issue.

As noted above, technological constraints have limited the ability of engineers to examine the operation of CPU interconnect buses due, for example, to throughput bandwidth and latency issues. However, as the performance of overall computer technology has advanced, the throughput bandwidth and latency of other bus systems used in computer systems has also improved. For example, the peripheral bus system used to connect external circuit boards and devices for direct communication with computer processors (e.g., Peripheral Component Interconnect Express (PCIe)) has also increased throughput bandwidth and reduced latency. The latest generations of PCIe, generations 3.0, 4.0, and 5.0, approach or exceed the throughput bandwidth of commonly used CPU interconnect buses.

Certain embodiments of this disclosure may use an external peripheral interconnect switch having multiple ports, including individual ports directly coupled to respective peripheral interconnect slots associated with respective individual processors in the multiprocessor system. Certain embodiments may allow examining of interprocessor communication traces at a switch memory associated with the peripheral interconnect switch, while individual processors are not loaded with memory transfer operations to the switch memory. Certain embodiments may thus generate an instruction related to a transaction for a multiprocessor operating system executing on the multiprocessor system, and then examine interprocessor communications in the switch memory that result from the instruction. Certain embodiments may examine the interprocessor communication traces while the multiprocessor system is responding to the instruction.

Turning now to the drawings, FIG. 1 is a depiction of a test board 120 for examining CPU interconnect buses in a multiprocessor system. As used herein, "examining" can include or be associated with monitoring, testing, activating, tracing, tracking, recording, analyzing, debugging, capturing, triggering, calculating, outputting, among other related operations. In FIG. 1, test board 120 may represent an electronic device such as a printed circuit board (PCB) or similar type of circuit. As shown, test board 120 is populated with a switch 122 that is configured to switch among peripheral interconnect bus ports, referred to herein as switch ports or simply ports 124, while switch 122 may be referred to as a bus switch, a peripheral interconnect switch, a peripheral switch, among other similar terms. In particular implementations, switch 122 represents a PCI Express (PCIe) switch. In various implementations, switch 122 supports PCIe devices and interfaces. As shown, switch 122 can include N number of ports, labeled as ports 124-1, 124-2, 124-3, 124-4, 124-5, 124-6, 124-7, 128-8, up to 124-N.

Also shown included with switch 122 in FIG. 1 is a switch buffer 130 that may represent a common memory accessible to ports 124 included in switch 122. Switch 122 is also shown including one or more direct memory access (DMA) controllers 140 that can be configured to transfer data from different memories without involvement of another processor, such as test data 306 from a memory 304 to switch buffer 130 (see FIGS. 3A and 3B). It is noted that switch 122 may further include components for performing data processing, such as for controlling ports 124, accessing switch buffer 130, among other tasks. Accordingly, switch 122 includes a controller 150 and a firmware 152 that is accessible to and can store instructions executable by controller 150. Controller 150 can include functionality for performing data processing, such as by executing the instructions stored in firmware 152, including instructions to control DMA controller(s) 140. For example, controller 150 can send a first memory transfer instruction to a DMA controller 140 to configure DMA controller 140 to transfer test data 306 from a memory 304 to switch buffer 130, and can send a second memory transfer instruction to DMA controller 140 to initiate the transfer of test data 306, after which DMA controller 140 can independently perform the transfer.

Figure 2:
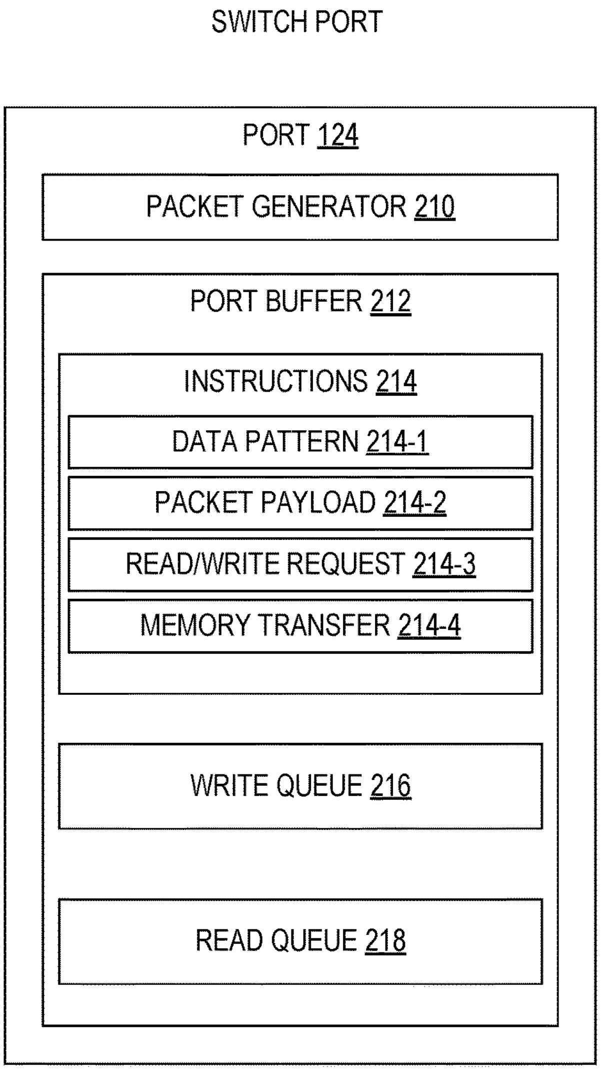
FIG. 2 is a depiction of a port in a test board, in an example.

FIG. 2 is a depiction of port 124 in test board 120. In FIG. 2, further details of port 124 are shown. Port 124 may include a packet generator 210 that may format data for outputting and receiving data in a desired packet format. Port 124 may further include executable instructions 214 that can be executed at switch 122, including a data pattern 214-1, a packet payload 214-2, read/write request 214-3, and memory transfer 214-4. Thus instructions 214 may configure port 124 and switch 122 to perform operations on a peripheral interconnect bus coupled to switch 122, such as sending instructions, receiving instructions, accessing memory (read and write) locations, as well as programming and initiating DMA transfers from a memory endpoint, such a memory device accessible via and coupled to port 124. Also as shown, port 124 includes a write queue 216 and a read queue 218 that may respectively send and receive data, such as packets handled by packet generator 210, to and from the peripheral interconnect bus. Write queue 216 and read queue 218 may be configured to access switch buffer 130 that can support multiple ports 124.

Figure 3A:
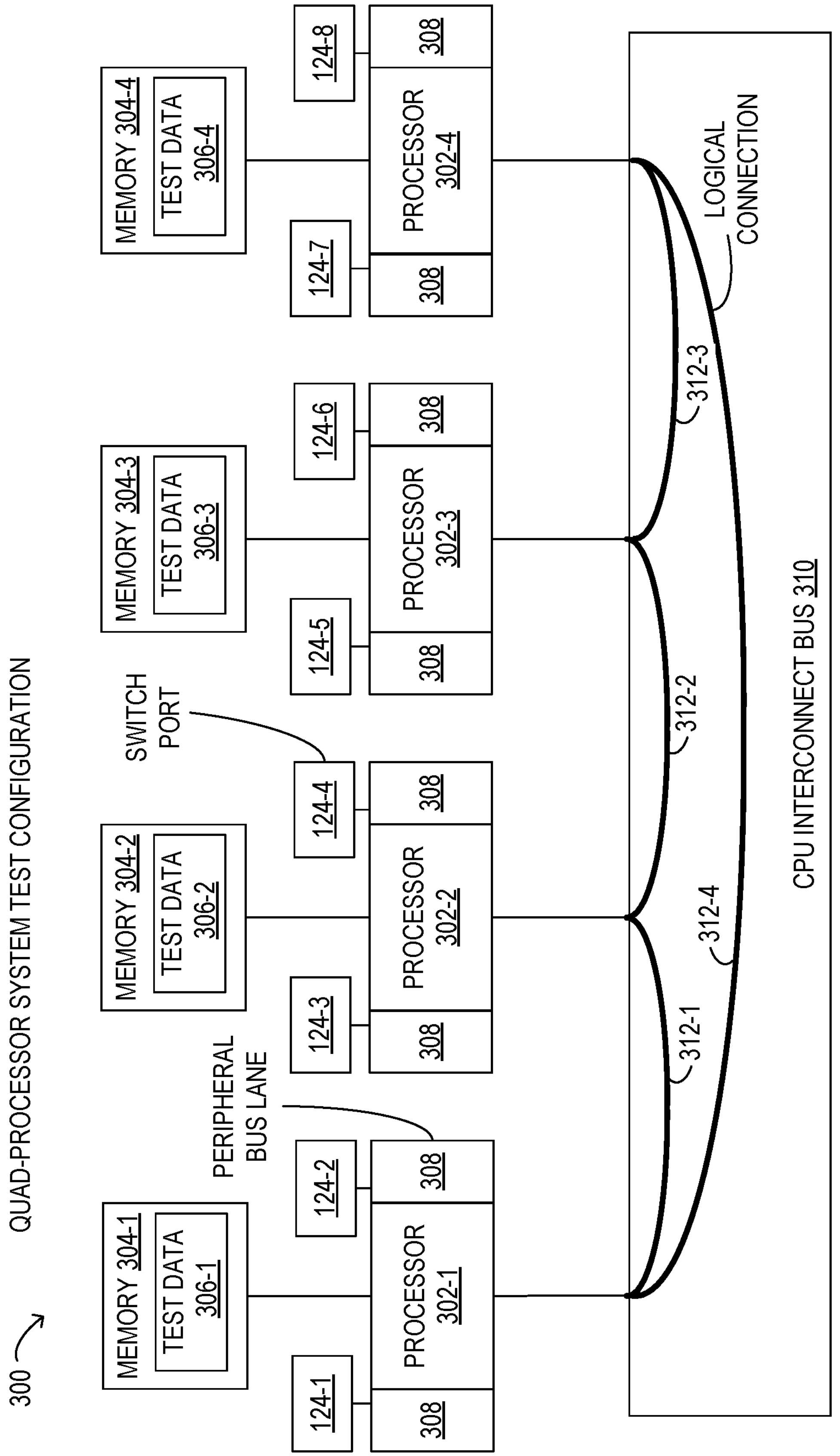
FIG. 3A is a depiction of a quad processor test system configuration, in an example.

Referring now to FIG. 3A, a quad processor test system configuration 300, or simply configuration 300, is depicted schematically. Configuration 300 in FIG. 3A includes a CPU interconnect bus 310 that provides high speed bidirectional communication among processors 302, specifically first processor 302-1, second processor 302-2, third processor 302-3, and fourth processor 302-4. Although 4 processors are shown in configuration 300 for descriptive clarity, fewer or more processors 302 can be used in different implementations.

In FIG. 3A, CPU interconnect bus 310 may represent physical interconnections between processors 302 and is shown having logical connections 312 established thereon that can be configured for unidirectional or bidirectional data transfer, also referred to as data transmission, between individual processors 302. Specifically, logical connection 312-1 establishes data transfer between first processor 302-1 and second processor 302-2, logical connection 312-2 establishes data transfer between second processor 302-2 and third processor 302-3, logical connection 312-3 establishes data transfer between third processor 302-3 and fourth processor 302-4, and logical connection 312-4 establishes data transfer between fourth processor 302-4 and first processor 302-1. It is noted that logical connections 312 may be used simultaneously and bidirectionally in various implementations.

In FIG. 3A, processors 302 are shown including multiple peripheral bus lanes 308 that support the peripheral interconnect bus that switch 122 and ports 124 support. Accordingly, each processor 302 in configuration 300 is shown connected to two individual ports 124 of switch 122 at peripheral bus lanes 308. Specifically, first processor 302-1 is coupled to ports 124-1 and 124-2, second processor 302-2 is coupled to ports 124-3 and 124-4, third processor 302-3 is coupled to ports 124-5 and 124-6, and fourth processor 302-4 is coupled to ports 124-7 and 124-8.

In configuration 300 of FIG. 3A, processors 302 are further connected to a respective memory 304 that is shown storing test data 306. Specifically, first processor 302-1 is connected to memory 304-1 storing test data 306-1, second processor 302-2 is connected to memory 304-2 storing test data 306-2, third processor 302-3 is connected to memory 304-3 storing test data 306-3, and fourth processor 302-4 is connected to memory 304-4 storing test data 306-4.

In operation of configuration 300, port 124 can be used to send and receive data and instructions to processors 302 to perform various examination procedures, such as by using logical connections 312 to transmit data and examine the CPU interconnect buses among processors 302, including recording the results to analyze interprocessor communication traces, for example. Accordingly, test data 306 can be written via port 124 or can be written by a respective processor 302. Test data 306 can also include results or processor output to an instruction received by processor 302. In the multiprocessor system shown, an instruction executed by one processor 302 can result in test data 306 being generated and locally stored by another processor 302 in its respective memory 304. Various other types of data transfer and instructions can be performed for examining interprocessor communication using configuration 300, as will be described in further detail.

Because two ports 124 of switch 122 are coupled to each processor 302 in configuration 300, two logical connections 312 can be examined per processor 302, since each port 124 can provide sufficient or maximum data throughput commensurate with one logical connection 312.

Further, using configuration 300, each logical connection 312 can be examined in full duplex or full bidirectional operation, since one port 124 is available for each endpoint of logical connection 312. In this manner, data can be streamed to processor 302 or memory 304 from one port 124, transmitted to another processor 302 or memory 304, and received by another port 124. Since ports 124 are included with switch 122, data or results involved with such an examination can be recorded in switch buffer 130 for post-examination analysis and evaluation, such as to determine errors or latency from interprocessor communication traces. In some cases, a result of the examination can be trace data that confirms the stability and proper operation of a multi-processor system being examined while operating at maximum data throughput rates on the connected CPU interconnect buses, which can include 2, 4, 6, or 8 ports 124 operating for bidirectional data transfer with simultaneous operation.

In various implementations, because ports 124 can receive and transmit data at a maximum data rate supported by CPU interconnect bus 310, one or more or all logical connections 312 can be saturated or flooded with data at the maximum data rate. In particular test cases, four logical connections 312 can be simultaneously saturated with data in a bidirectional manner using configuration 300. In this manner, the operation and behavior of processors 302 under saturation conditions of CPU interconnect bus 310 can be reliably examined, which is desirable. In particular performance issues at performance limits of operation can be identified and resolved, so that more scalable overall performance of the multiprocessor computer system can be realized.

Figure 3B:
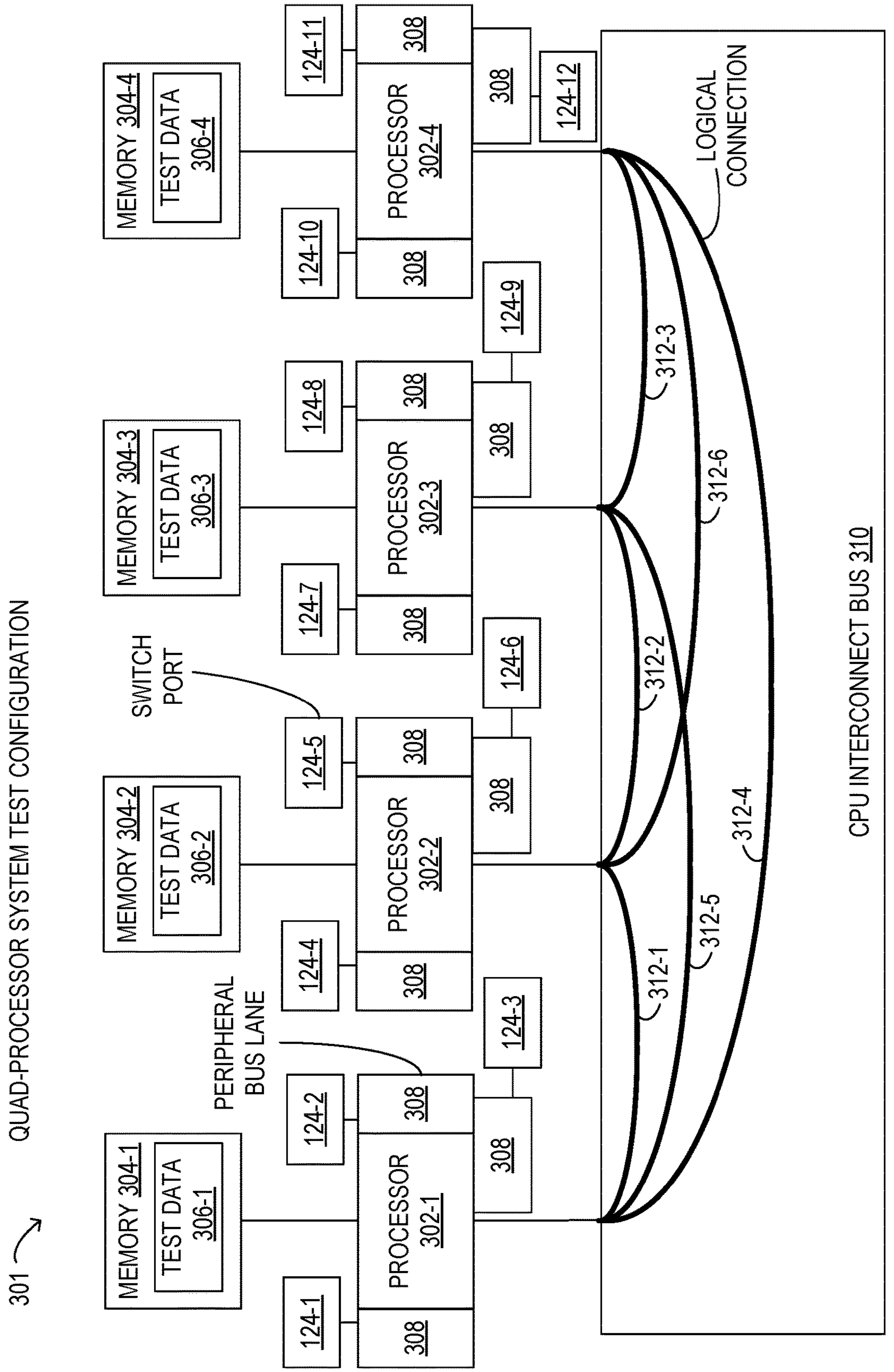
FIG. 3B is a depiction of a quad processor test system configuration, in an example.

Referring now to FIG. 3B, a quad processor test system configuration 301, or simply configuration 301, is depicted schematically. Configuration 301 in FIG. 3B includes a CPU interconnect bus 310 that provides high speed bidirectional communication among processors 302, specifically first processor 302-1, second processor 302-2, third processor 302-3, and fourth processor 302-4. As shown configuration 301 is substantially similar to configuration 300 described above with respect to FIG. 3A.

In configuration 301 of FIG. 3B, instead of 2 ports 124 per processor 302 as in configuration 300 of FIG. 3A, 3 ports 124 per processor 302 are coupled via respective peripheral bus lanes 308 provided by processor 302. Accordingly, each processor 302 in configuration 301 is shown connected to three individual ports 124 of switch 122 at peripheral bus lanes 308. Specifically, first processor 302-1 is coupled to ports 124-1, 124-2, and 124-3, second processor 302-2 is coupled to ports 124-4, 124-5, and 124-6, third processor 302-3 is coupled to ports 124-7, 124-8, and 124-9, and fourth processor 302-4 is coupled to ports 124-10, 124-11, and 124-12.

In FIG. 3B, CPU interconnect bus 310 may represent physical interconnections between processors 302 and is shown having logical connections 312 established thereon that can be configured for unidirectional or bidirectional data transfer, also referred to as data transmission, between individual processors 302. Specifically, logical connection 312-1 establishes data transfer between first processor 302-1 and second processor 302-2, logical connection 312-2 establishes data transfer between second processor 302-2 and third processor 302-3, logical connection 312-3 establishes data transfer between third processor 302-3 and fourth processor 302-4, logical connection 312-4 establishes data transfer between fourth processor 302-4 and first processor 302-1, logical connection 312-5 establishes data transfer between first processor 302-1 and third processor 302-3, and logical connection 312-6 establishes data transfer between second processor 302-2 and fourth processor 302-4. It is noted that logical connections 312 may be used simultaneously and bidirectionally in various implementations.

In operation of configuration 301 for testing processors 302, each processor 302 can establish 3 concurrent, bidirectional logical connections 312 to each other processor in the quad processor system shown in FIG. 3B. Using three ports 124 per processor 302, switch 122 can flood three logical connections 312 to each of the other three processors 302. Further, the same type of configuration of logical connections 312 can be concurrently established for each of the four processors 302 in configuration 301. In this manner, six logical connections 312 can be simultaneously saturated with data being transferred bidirectionally at full data throughput rates between six pairs of processors 302 in configuration 301, which is desirable. In addition to achieving the saturation condition for CPU interconnect bus 310, interprocessor communication traces and all data transferred by CPU interconnect bus 310 can be collected by switch 122 in switch buffer 130.

Depending on an N number of ports 124 available at switch 122, one or more switches 122 may be used in larger or other configurations where greater values of N number of ports 124 is desired or higher data rates are desired. For example, a certain ratio of ports 124 to logical connections 312 may be determined by maximum data transfer rates of peripheral bus lanes 308, CPU interconnect bus 310, or both, in different implementations.

Figure 4:
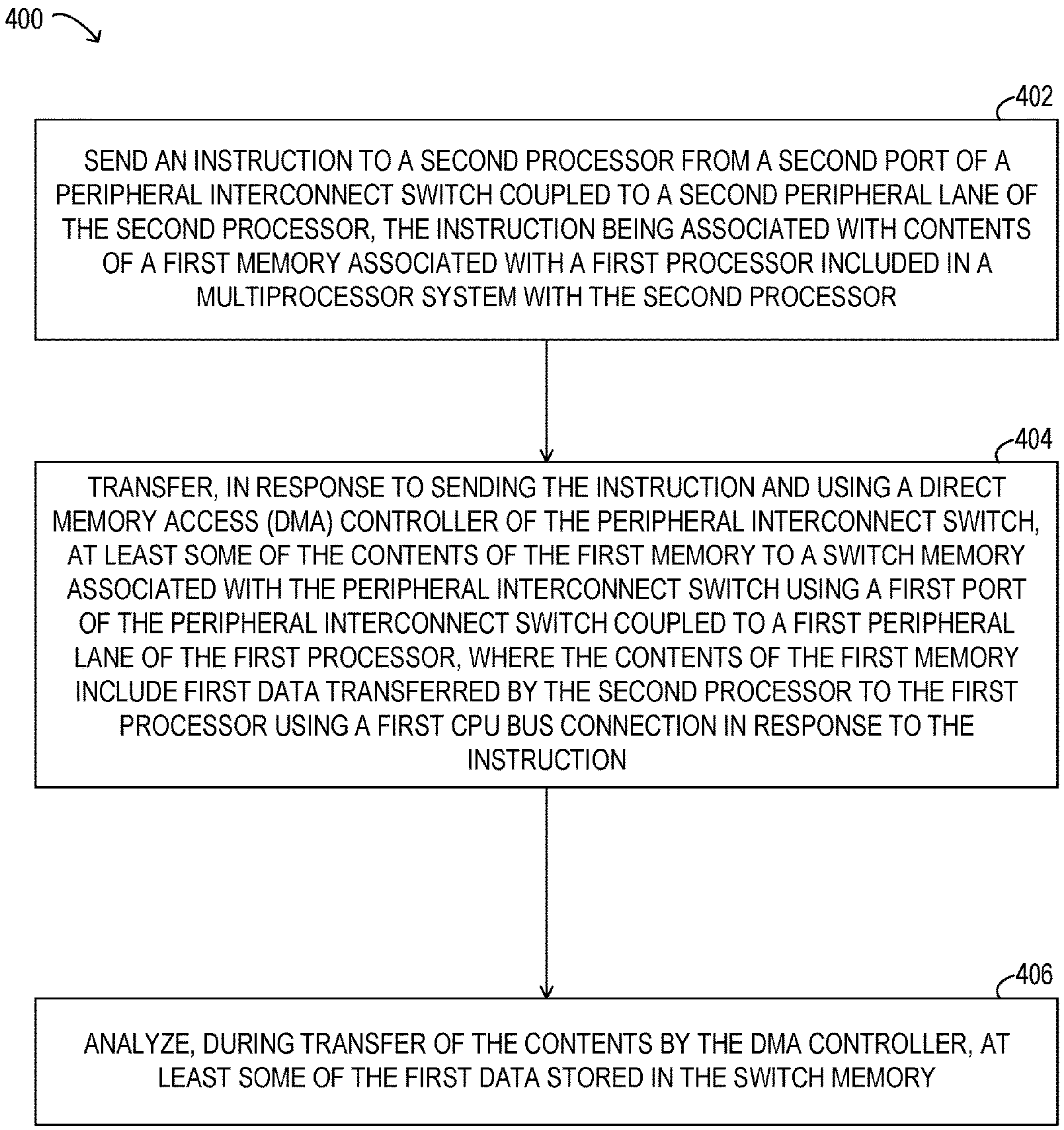
FIG. 4 is a flowchart of a method of examining a multiprocessor system, in an example.

FIG. 4 is a flowchart of a method 400 of examining a multiprocessor system. Method 400 may be performed using configuration 300 depicted in and as described above with respect to FIG. 3A. Various operations in method 400 may be rearranged or omitted in various cases.

Method 400 begins at step 402 by sending an instruction to a second processor from a second port of a peripheral interconnect switch coupled to a second peripheral lane of the second processor, the instruction being associated with contents of a first memory associated with a first processor included in a multiprocessor system with the second processor. In response to sending the instruction and using a direct memory access (DMA) controller of the peripheral interconnect switch, at step 404, at least some of the contents of the first memory are transferred to a switch memory associated with the peripheral interconnect switch using a first port of the peripheral interconnect switch coupled to a first peripheral lane of the first processor, where the contents of the first memory include first data transferred by the second processor to the first processor using a first CPU bus connection in response to the instruction. The first data can be transferred using the first CPU bus connection at a maximum data transfer rate supported by the multiprocessor system. The contents of the first memory that are transferred to the switch memory can be less than all contents of the first memory. At step 406, during transfer of the contents by the DMA controller, at least some of the first data stored in the switch memory are analyzed. Analyzing at least some of the first data stored in the switch memory can include analyzing latency of the first data, or analyzing errors in the first data, or both.

Figure 5A:
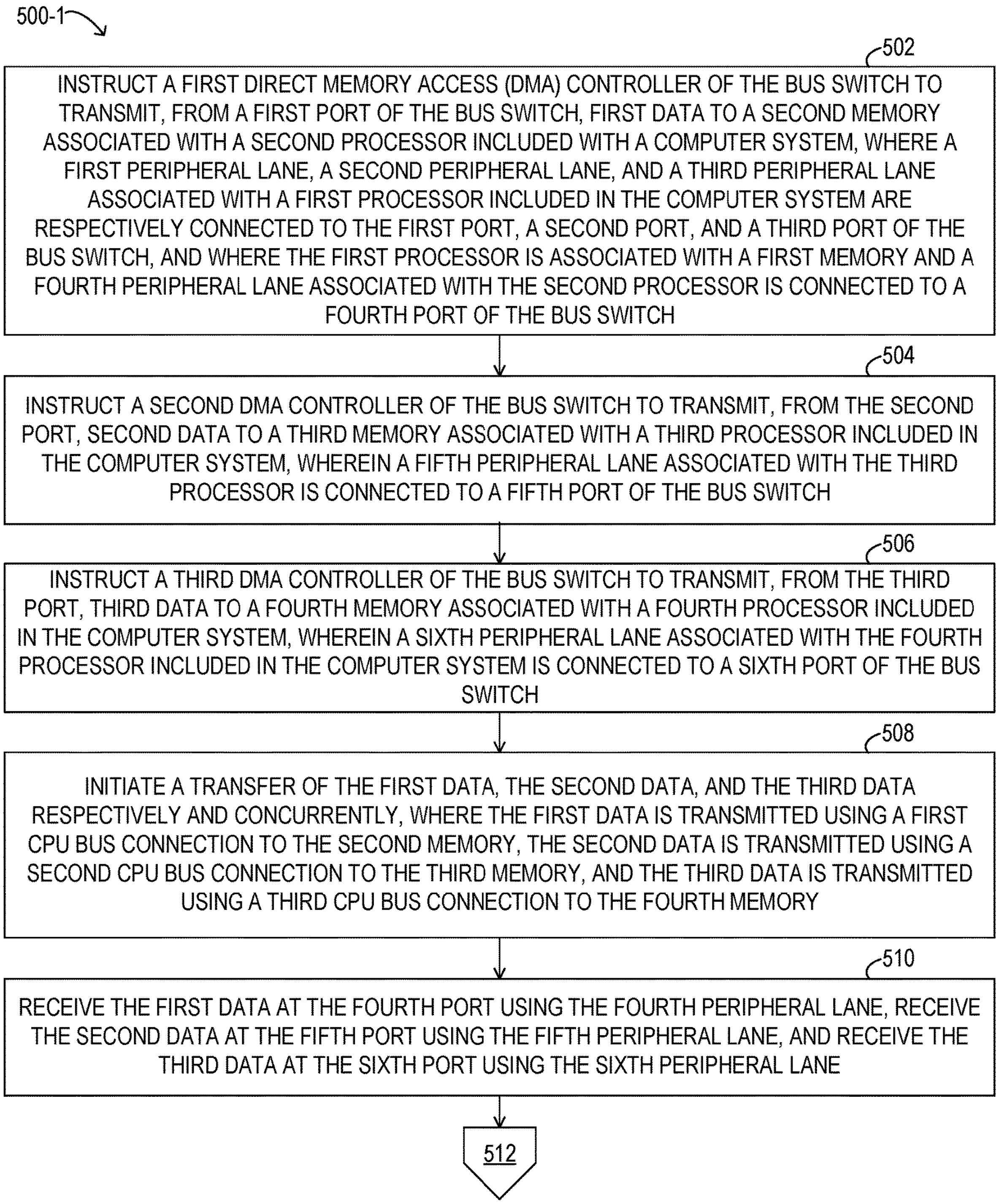
FIGS. 5A and 5B are a flowchart of a method of examining a multiprocessor system, in an example.
Figure 5B:
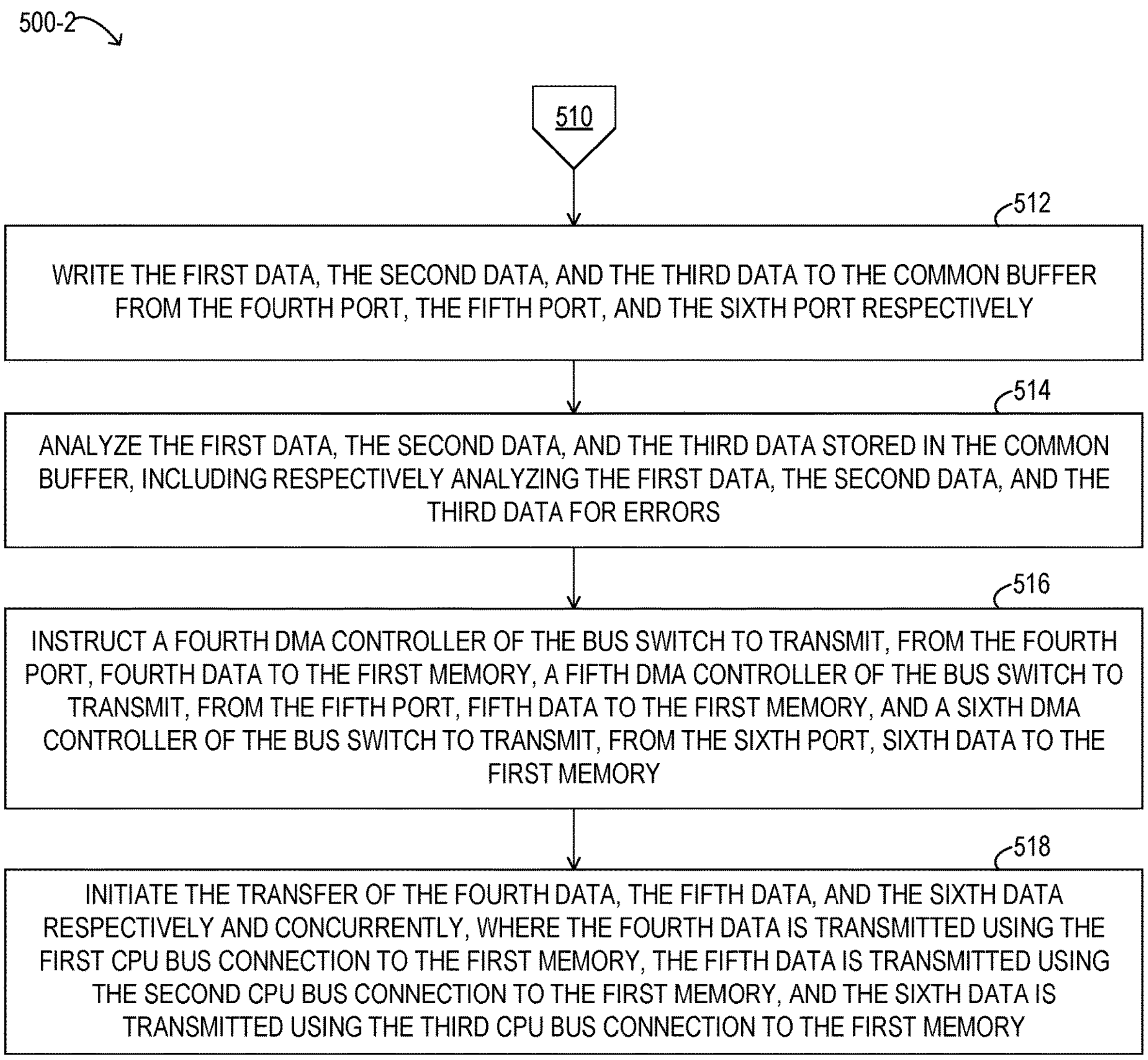

FIGS. 5A and 5B are flowcharts of a method 500 of examining a multiprocessor system. Method 500 is split into two portions 500-1 and 500-2 in FIGS. 5A and 5B respectively, and may be performed using configuration 301 depicted in and as described above with respect to FIG. 3B. Various operations in method 500 may be rearranged or omitted in various cases. Method 500 may be performed by a test board including a bus switch having multiple ports and a common buffer, where the bus switch supports a peripheral interconnect bus.

Method 500-1 in FIG. 5A begins at step 502 by instructing a first direct memory access (DMA) controller of the bus switch to transmit, from a first port of the bus switch, first data to a second memory associated with a second processor included with a computer system, where a first peripheral lane, a second peripheral lane, and a third peripheral lane associated with a first processor included in the computer system are respectively connected to the first port, a second port, and a third port of the bus switch, and where the first processor is associated with a first memory and a fourth peripheral lane associated with the second processor is connected to a fourth port of the bus switch.

At step 504, a second DMA controller of the bus switch is instructed to transmit, from the second port, second data to a third memory associated with a third processor included in the computer system, wherein a fifth peripheral lane associated with the third processor is connected to a fifth port of the bus switch. At step 506, a third DMA controller of the bus switch is instructed to transmit, from the third port, third data to a fourth memory associated with a fourth processor included in the computer system, wherein a sixth peripheral lane associated with the fourth processor included in the computer system is connected to a sixth port of the bus switch. At step 508, a transfer of the first data, the second data, and the third data respectively and concurrently is initiated, where the first data is transmitted using a first CPU bus connection to the second memory, the second data is transmitted using a second CPU bus connection to the third memory, and the third data is transmitted using a third CPU bus connection to the fourth memory. At step 510, the first data are received at the fourth port using the fourth peripheral lane, the second data at the fifth port are received using the fifth peripheral lane, and the third data at the sixth port are received using the sixth peripheral lane. After step 510 method 500 proceeds to method 500-2 in FIG. 5B.

Method 500-2 in FIG. 5B begins at step 512 by writing the first data, the second data, and the third data to the common buffer from the fourth port, the fifth port, and the sixth port respectively. At step 514, the first data, the second data, and the third data stored in the common buffer are analyzed, including respectively analyzing the first data, the second data, and the third data for errors. At step 516, a fourth DMA controller of the bus switch is programmed to transmit, from the fourth port, fourth data to the first memory, a fifth DMA controller of the bus switch is programmed to transmit, from the fifth port, fifth data to the first memory, and a sixth DMA controller of the bus switch is programmed to transmit, from the sixth port, sixth data to the first memory. At step 518, the transfer of the fourth data, the fifth data, and the sixth data respectively and concurrently is initiated, where the fourth data is transmitted using the first CPU bus connection to the first memory, the fifth data is transmitted using the second CPU bus connection to the first memory, and the sixth data is transmitted using the third CPU bus connection to the first memory.

Figure 6A:
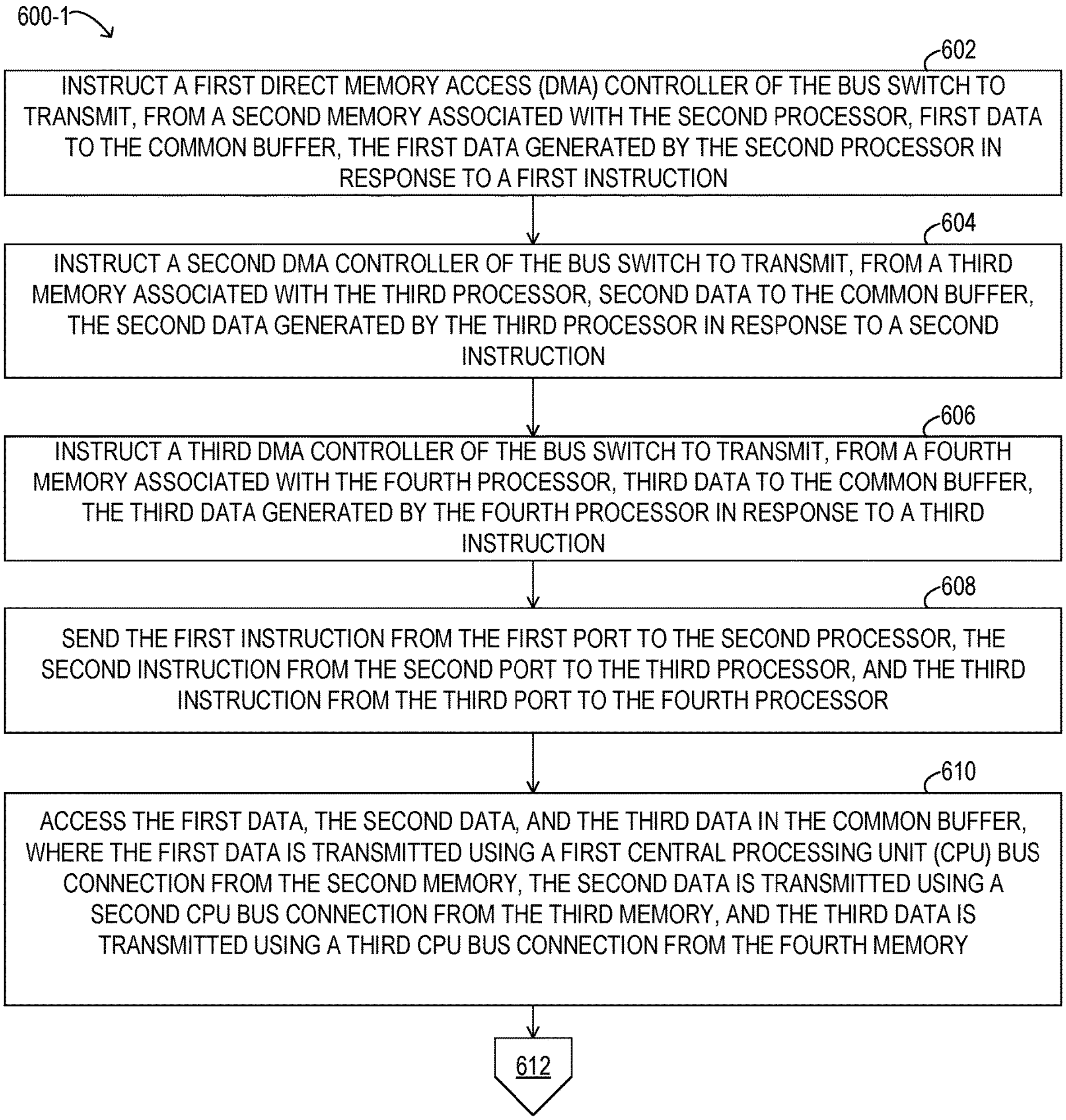
FIGS. 6A and 6B are a flowchart of a method of examining a multiprocessor system, in an example.
Figure 6B:
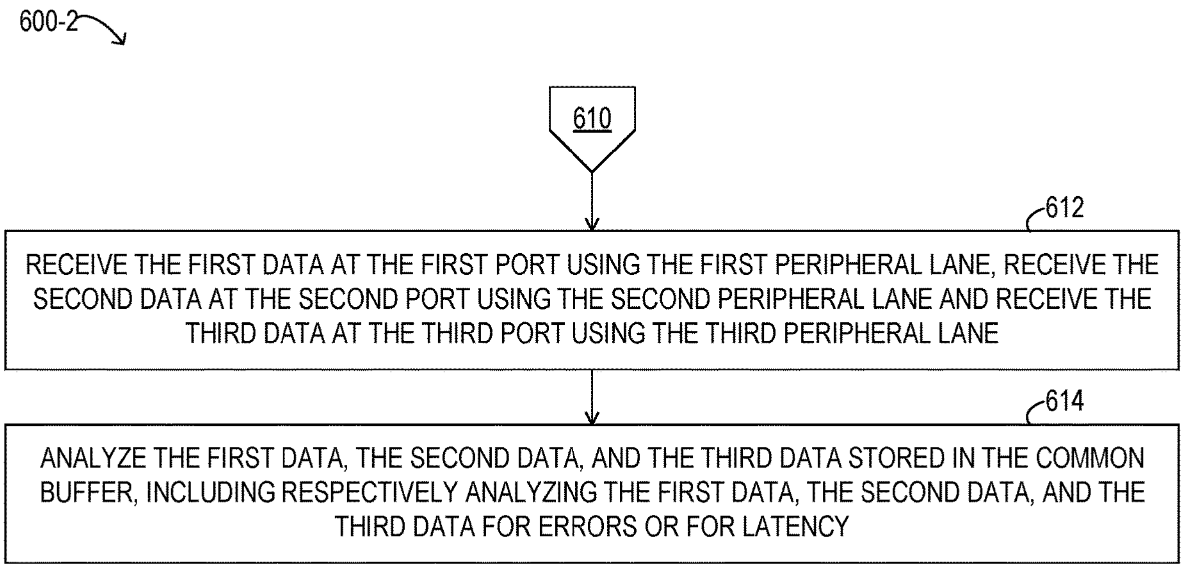

FIGS. 6A and 6B are flowcharts of a method 600 of examining a multiprocessor system. Method 600 is split into two portions 600-1 and 600-2 in FIGS. 6A and 6B, respectively, and may be performed using configuration 301 depicted in and as described above with respect to FIG. 3B. Various operations in method 600 may be rearranged or omitted in various cases.

Method 600-1 in FIG. 6A begins at step 602 by instruct a first direct memory access (DMA) controller of the bus switch to transmit, from a second memory associated with the second processor, first data to the common buffer, the first data generated by the second processor in response to a first instruction. At step 604, a second DMA controller of the bus switch is instructed to transmit, from a third memory associated with the third processor, second data to the common buffer, the second data generated by the third processor in response to a second instruction.

At step 606, a third DMA controller of the bus switch is instructed to transmit, from a fourth memory associated with the fourth processor, third data to the common buffer, the third data generated by the fourth processor in response to a third instruction. At step 608, the first instruction is sent from the first port to the second processor, the second instruction from the second port to the third processor, and the third instruction from the third port to the fourth processor. At step 610, the first data, the second data, and the third data are accessed in the common buffer, where the first data is transmitted using a first central processing unit (CPU) bus connection from the second memory, the second data is transmitted using a second CPU bus connection from the third memory, and the third data is transmitted using a third CPU bus connection from the fourth memory. After step 610 method 600 proceeds to method 600-2 in FIG. 6B.

Method 600-2 in FIG. 6B begins at step 612 by receiving the first data at the first port using the first peripheral lane, receiving the second data at the second port using the second peripheral lane and receiving the third data at the third port using the third peripheral lane. At step 614, the first data, the second data, and the third data stored in the common buffer are analyzed, including respectively analyzing the first data, the second data, and the third data for errors or latency.

As disclosed herein, a DMA controller of a peripheral switch is programmed to transfer memory contents to a switch memory including an instruction for a second processor. The instruction is sent from a second port of the switch coupled to a second peripheral lane of the second processor. Then, the contents are transferred to the switch memory using a first port of the switch coupled to a first peripheral lane of the first processor. The memory contents include first data transferred by the second processor to the first processor using a central processing unit (CPU) bus connection in response to the instruction.

The foregoing outlines features of several examples so that those skilled in the art may better understand the aspects of the present disclosure. Various modifications and combinations of the illustrative examples, as well as other examples, are contemplated in the description.

What is claimed is:

1. A method, comprising:

sending an instruction to a second processor from a second port of a peripheral interconnect switch coupled to a second peripheral lane of the second processor, the instruction being associated with contents of a first memory coupled to a first processor included in a multiprocessor system with the second processor; and transferring, in response to sending the instruction and using a direct memory access (DMA) controller of the peripheral interconnect switch, at least some of the contents of the first memory to a switch memory of the peripheral interconnect switch using a first port of the peripheral interconnect switch coupled to a first peripheral lane of the first processor, wherein the contents of the first memory include first data transferred by the second processor to the first processor using a first central processing unit (CPU) bus connection in response to the instruction.

2. The method of claim 1, further comprising:

analyzing, during the transferring by the DMA controller, at least some of the first data stored in the switch memory.

3. The method of claim 2, wherein analyzing at least some of the first data stored in the switch memory includes at least one of: analyzing latency of the first data, or analyzing errors in the first data.

4. The method of claim 1, wherein the first data are transferred using the first CPU bus connection at a maximum data transfer rate supported by the multiprocessor system.

5. The method of claim 1, wherein the contents of the first memory that are transferred to the switch memory are less than all contents of the first memory.

6. A device, comprising:

a test board including a bus switch having multiple ports and a common buffer shared among the multiple ports and configured to store data received from different ports of the multiple ports for analysis, wherein the bus switch is configured to be coupled to a peripheral interconnect bus, and wherein the test board is configured to:

instruct a first direct memory access (DMA) controller of the bus switch to transmit, from a first port of the bus switch, first data to a second memory coupled to a second processor included with a computer system, wherein a first peripheral lane, a second peripheral lane, and a third peripheral lane of a first processor included in the computer system are respectively connected to the first port, a second port, and a third port of the bus switch, and wherein the first processor is coupled to a first memory and a fourth peripheral lane of the second processor is connected to a fourth port of the bus switch;

instruct a second DMA controller of the bus switch to transmit, from the second port, second data to a third memory coupled to a third processor included in the computer system, wherein a fifth peripheral lane of the third processor is connected to a fifth port of the bus switch;

instruct a third DMA controller of the bus switch to transmit, from the third port, third data to a fourth memory coupled to a fourth processor included in the computer system, wherein a sixth peripheral lane of the fourth processor included in the computer system is connected to a sixth port of the bus switch; and initiate transmission of the first data, the second data, and the third data concurrently, wherein the first data is transmitted to the second memory via a first central processing unit (CPU) bus connection between the first processor and the second processor, the second data is transmitted to the third memory via a second CPU bus connection between the first processor and the third processor, and the third data is transmitted to the fourth memory via a third CPU bus connection between the first processor and the fourth processor.

7. The device of claim 6, wherein the test board is further configured to:

receive the first data at the fourth port using the fourth peripheral lane;

receive the second data at the fifth port using the fifth peripheral lane; and receive the third data at the sixth port using the sixth peripheral lane.

8. The device of claim 7, wherein the test board is further configured to:

write the first data, the second data, and the third data to the common buffer from the fourth port, the fifth port, and the sixth port respectively.

9. The device of claim 8, wherein the test board is further configured to:

analyze the first data, the second data, and the third data stored in the common buffer, including respectively analyzing the first data, the second data, and the third data for errors.

10. The device of claim 6, wherein:

the first data are transmitted at a maximum data transfer rate supported by the computer system;

the second data are transmitted at the maximum data transfer rate; and the third data are transmitted at the maximum data transfer rate.

11. The device of claim 6, wherein the test board is further configured to:

instruct a fourth DMA controller of the bus switch to transmit, from the fourth port, fourth data to the first memory;

instruct a fifth DMA controller of the bus switch to transmit, from the fifth port, fifth data to the first memory;

instruct a sixth DMA controller of the bus switch to transmit, from the sixth port, sixth data to the first memory; and initiate a transmission of the fourth data, the fifth data, and the sixth data respectively and concurrently, wherein the fourth data is transmitted using the first CPU bus connection to the first memory, the fifth data is transmitted using the second CPU bus connection to the first memory, and the sixth data is transmitted using the third CPU bus connection to the first memory.

12. The device of claim 11, wherein the first data, the second data, the third data, the fourth data, the fifth data, and the sixth data are transmitted concurrently.

13. A system, comprising:

a computer system comprising a first processor, a second processor, a third processor, and a fourth processor interconnected by central processing unit (CPU) bus connections that comprise a first CPU bus connection between the first processor and the second processor, a second CPU bus connection between the first processor and the third processor, and a third CPU bus connection between the second processor and the third processor;

a test board including a bus switch having multiple ports and a common buffer, wherein the bus switch is configured to be coupled to a peripheral interconnect bus;

a first peripheral lane, a second peripheral lane, and a third peripheral lane of the first processor respectively connected to a first port, a second port, and a third port of the bus switch, wherein the first processor is coupled to a first memory;

a fourth peripheral lane of the second processor connected to a fourth port of the bus switch;

a fifth peripheral lane of the third processor connected to a fifth port of the bus switch; and a sixth peripheral lane of the fourth processor connected to a sixth port of the bus switch;

wherein the test board is configured to cause test data to be generated for testing the CPU bus connections.

14. The system of claim 13, wherein the test board is configured to:

instruct a first direct memory access (DMA) controller of the bus switch to transmit, from a second memory coupled to the second processor, first data to the common buffer, the first data generated by the second processor in response to a first instruction;

instruct a second DMA controller of the bus switch to transmit, from a third memory coupled to the third processor, second data to the common buffer, the second data generated by the third processor in response to a second instruction;

instruct a third DMA controller of the bus switch to transmit, from a fourth memory coupled to the fourth processor, third data to the common buffer, the third data generated by the fourth processor in response to a third instruction;

send the first instruction from the first port to the second processor, the second instruction from the second port to the third processor, and the third instruction from the third port to the fourth processor; and access the first data, the second data, and the third data in the common buffer, wherein the first data is transmitted using the first CPU bus connection from the second memory, the second data is transmitted using the second CPU bus connection from the third memory, and the third data is transmitted using the third CPU bus connection from the fourth memory.

15. The system of claim 14, wherein the test board is further configured to:

receive the first data at the first port using the first peripheral lane;

receive the second data at the second port using the second peripheral lane; and receive the third data at the third port using the third peripheral lane.

16. The system of claim 15, wherein the test board is further configured to:

analyze the first data, the second data, and the third data stored in the common buffer for errors.

17. The system of claim 16, wherein the test board is further configured to:

analyze the first data for latency;

analyze the second data for latency; and analyze the third data for latency.

18. The system of claim 14, wherein:

the first data are transmitted at a maximum data transfer rate supported by the computer system;

the second data are transmitted at the maximum data transfer rate; and the third data are transmitted at the maximum data transfer rate.

19. The system of claim 14, wherein:

the first CPU bus connection communicates between the first processor and the second processor;

the second CPU bus connection communicates between the first processor and the third processor; and the third CPU bus connection communicates between the first processor and the fourth processor.

20. The device of claim 6, wherein the first port includes:

a packet generator; and a port buffer, the port buffer comprising:

a write queue; and a read queue.

* * * * *